United States Patent Office 3,755,583
Patented Aug. 28, 1973

3,755,583
BENZOTHIENO[3,2-d]- AND BENZOFURO[3,2-d]
PYRIMIDINES INHIBITORS OF PLATELET
AGGREGATION
Gerald George De Angelis, North Stonington, and Hans-Jurgen Ernst Hess, Old Lyme, Conn., assignors to Pfizer Inc., New York, N.Y.
No Drawing. Original application June 5, 1970, Ser. No. 43,974, now Patent No. 3,706,747. Divided and this application Nov. 24, 1971, Ser. No. 202,029
Int. Cl. A61k 27/00
U.S. Cl. 424—251    8 Claims

ABSTRACT OF THE DISCLOSURE 4-aminobenzothieno[3,2-d]- and 4 - aminobenzofuro-[3,2-d]pyrimidines and salts thereof, novel classes of heterocyclic compounds useful as inhibitors of platelet aggregation.

CROSS REFERENCE TO RELATED APPLICATION

This application is a division of application Ser. No. 43,974 filed June 5, 1970 now U.S. Pat. No. 3,706,747.

BACKGROUND OF THE INVENTION

This invention relates to benzothieno[3,2-d]- and benzofuro[3,2-d]pyrimidines, and more particularly to a unique series of 4-amino and substituted amino- congeners thereof and their acid addition salts, possessing chemotherapeutic activity and to the method of inhibiting platelet aggregation in warm-blooded animals with said agents.

E. C. Taylor et al., Angew. Chem. Intern. Ed., 5, 131 (1966) has reported the synthesis of 4-amino-5,6,7,8-tetrahydrobenzothieno[2,3-d]pyrimidine and K. Gewald, Ber., 99, 1002 (1966), the corresponding benzofuro[2,3-d]pyrimidine analog, with no statements of utility. Swiss Pat. 10,522, published Jan. 22, 1970, discloses derivatives of 4 - (dialkylaminoalkyl)amino-5,6,7,8-tetrahydrobenzothieno[2,3-d]pyrimidines, reportedly useful as antiphologistic and hypotensive agents.

A. I. Travin et al., Khim. Geterotsikl. Soedin, 77 (1967), (C. A. 67, 32668), describes several 2-methyl-benzothieno[3,2-d]pyrimidines containing a substituent at the 4-position including ethoxy, piperidine, 4-benzoyl-piperazine, 4-methylpiperazine, piperazine, diethylamino-ethylamino and 3-diethylamino - 2 - hydroxypropylamino with no disclosed utility.

2,4-diamino derivatives of thieno[3,2-d]pyrimidines are reported by E. Woitun et al., U.S. Pat. No. 3,475,429, to be useful as coronary and peripheral blood vessel dilators and sedatives, and as inhibitors of the aggregation of platelets in warm-blooded animals.

SUMMARY OF THE INVENTION

The inhibitors of platelet aggregation of this invention are represented by the formula:

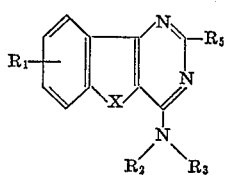

and the acid addition salts thereof, wherein:
$R_1$ is hydrogen; fluorine; chlorine; bromine; trifluoromethyl; hydroxy; methoxy; 7,8-dimethoxy; nitro- dimethylamino; amino and substituted amino wherein said substituent is selected from the group consisting of alkylsulfonyl and acyl containing 1 to 4 carbon atoms, benzoyl and carbalkoxy containing 2 to 6 carbon atoms; carboxamido of the formula —$CO_2R_4$ wherein $R_4$ is hydrogen or alkyl containing 1 to 4 carbon atoms;

$R_2$ and $R_3$ when considered separately are each selected from the group consisting of hydrogen; alkyl and monosubstituted alkyl wherein both alkyl moieties contain from 1 to 6 carbon atoms and said substituent is selected from the group consisting of hydroxy, carboxy, and dialkylamino said alkyl containing 1 to 3 carbon atoms; phenyl; monosubstituted phenyl wherein said substituent is selected from the group consisting of carboxy, sulfamoyl and carboxamido; pyridyl; monosubstituted pyridyl wherein said substituent is selected from the group consisting of carboxy, carboxamido and alkyl containing 1 to 3 carbon atoms; cycloalkyl containing 3 to 7 carbon atoms; pyrimidyl; substituted pyrimidyl wherein said substituent is 1 or 2 methyl substituents;

$R_2$ and $R_3$ when taken together with the nitrogen atom to which they are attached form a ring of the formula:

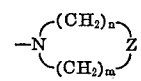

wherein Z is selected from the group consisting of $CH_2$, O, N-alkyl said alkyl containing 1 to 6 carbon atoms and S; m and n are each integers of 2 or 3;
$R_5$ is hydrogen or alkyl containing 1 to 6 carbon atoms; and
X is O or S.

Of particular interest, because of their inhibition of platelet aggregation, are compounds wherein $R_1$ is hydrogen and $R_2$ and $R_3$ are alkyl containing 1 to 6 carbon atoms, and those wherein $R_1$ and $R_2$ are hydrogen and $R_3$ is monosubstituted phenyl.

In accordance with the process employed for preparing the 4-aminobenzothieno[3,2-d]pyrimidines of the present invention of the formula:

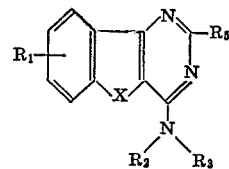

wherein $R_1$, $R_2$ and $R_3$ are as previously indicated, $R_5$ is hydrogen and X is S, the following scheme is illustrative:

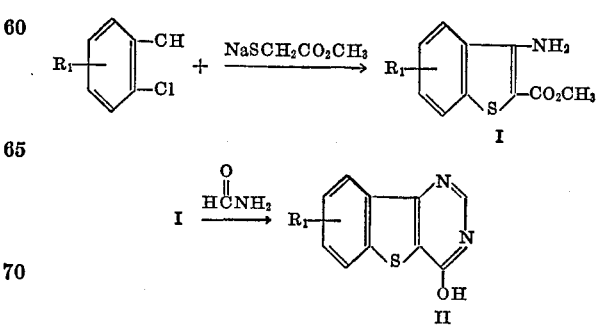

II $\xrightarrow{POCl_3}$ 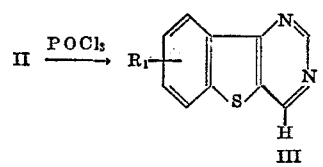

III

III $\xrightarrow{HNR_2R_3}$ 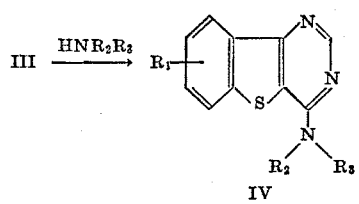

IV

In the first reaction of the aforementioned scheme an appropriately substituted o-chlorobenzonitrile is contacted with a salt of a lower alkyl thioglycolate ester in a reaction-inert solvent. In practice, sodium methyl thioglycolate, prepared by treating methyl thioglycolate with an equivalent amount of sodium alkoxide in a lower alkanol solvent followed by removal of the solvent in vacuo, is added to a reaction-inert solvent, preferably of moderately high polarity, e.g., dimethylformamide or hexamethylphosphoramide. The resulting solution or suspension of sodium methyl thioglycolate is treated with an equimolar amount of the requisite o-chlorobenzonitrile dissolved in the same solvent.

Alternately, the sodium salt of the methyl thioglycolic can be generated in situ in said reaction employing either an equimolar amount of sodium hydride or a sodium alkoxide.

The aforedescribed reaction is carried out at 50–100° C. for a period of 15 minutes to 2 hours. A convenient method of isolation is to cool the reaction mixture and subsequently add it to a mixture of ice and water. The desired product can be filtered, dried, and recrystallized from a suitable solvent.

The requisite o-chlorobenzonitriles are available commercially or can be synthesized by one skilled in the art, e.g., by the method of Nakaoka et al., German Pat. No. 1,230,026 (C.A. 66, 55255e).

Cyclization of the 2-carbomethoxy-3-aminobenzothiophenes (I) to the tricyclic 4-hydroxybenzothieno[3,2-d] pyrimidines (II) is carried out in a reaction-inert solvent such as dimethylsulfoxide or dimethylformamide using a 5 to 10 fold excess of formamide and an equimolar amount of an alkali metal lower alkoxide such as sodium methoxide or potassium t-butoxide. Reaction temperatures of 75–100° C. are employed with a reaction time of 30 minutes to 2 hours. The desired product is isolated by pouring the cooled reaction mixture into water followed by acidification with acetic acid, filtration and drying. The product can be further purified by trituration or re-crystallization from a suitable solvent.

The action af halogenating agents, e.g., thionyl chloride, phosphorous oxychloride or dichlorophenylphosphine oxide converts the 4 - hydroxybenzothieno[3,2-d] pyrimidines (II) to the corresponding 4-chloro analogs (III). In practice, II is added to a large excess of the appropriate reagent, preferably phosphorous oxychloride, and the mixture heated. Reflux temperatures are preferred, although lower temperatures may be employed with correspondingly longer reaction times. The reaction period is not critical, but will vary with temperature, concentration and reactivity of the starting reagents. In general, a period of from about 2 to about 8 hours is operable. A convenient method of isolation comprises removal of the excess phosphorous oxychloride in vacuo followed by treatment of the residue with water and sufficient ammonium hydroxide solution to render the solution basic. The resulting product is filtered and air dried. It can be used in this crude state for subsequent reaction or can be recrystallized from an appropriate solvent.

Displacement of the 4-chloro substituent of compounds of Formula III, leading to products of the instant invention, is effected in a reaction-inert solvent with ammonia or an amine, $HNR_2R_3$ wherein $R_2$ and $R_3$ are as previously described. In practice, a mixture of the appropriately substituted 4-chlorobenzothieno[3,2-d]pyrimidine and ammonia or a suitable amine are heated in a solvent such as ethanol, dimethylformamide, benzene or tetrahydrofuran. It is advantageous to employ at least 2 moles of amine per mole of halide, and as much as a 10 fold excess can be employed. It is generally desirable to heat the aforementioned reaction mixture to temperatures from about 40–150° C., with a preferred range of 75–100° C. Reaction times are not critical, and will vary with reaction temperature, molar quantities of reactants, etc. In general, periods of 1 to 6 hours are operable.

Isolation of the products of the instant invention following the aforedescribed final reaction is most conveniently carried out by diluting the water followed by extraction with a water immiscible solvent, e.g., chloroform, ether or benzene. The separated, non-aqueous phase is then dried over a suitable drying agent and the solvent removed in vacuo. The desired product can be used as the free base or can be converted to acid addition salts by conventional methods known to those skilled in the art.

Products of the present invention of the formula:

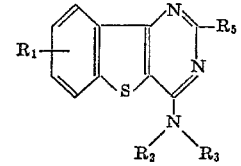

wherein $R_1$, $R_2$ and $R_3$ are as previously described, and $R_5$ is alkyl containing from 1 to 6 carbon atoms are prepared by a minor modification of the previously mentioned reaction sequence scheme, as follows:

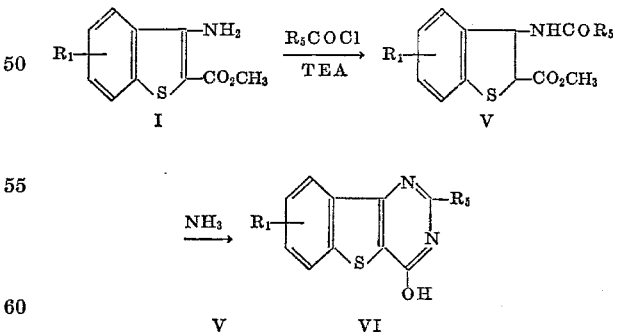

Acylations of compounds of Formula I are carried out with the requisite acid halide, preferably chloride, in a reaction-inert solvent in the presence of a tertairy amine, such as triethylamine (TEA). Reaction conditions found to produce optimal yields comprise addition of the appropriately substituted 2-carbomethoxy-3-aminobenzothiophene together with an equimolar amount of TEA, plus as much as a 20% excess, in a solvent such as tetrahydrofuran or dimethoxyethane to an excess of the appropriate acid chloride preheated from about 40–60° C. Heating is continued at these temperatures for an additional 30 minutes to 2 hours followed by removal of the excess acid chloride under reduced pressure. The residual product is partitioned between water and a water immiscible solvent such as diethylether. The non-aqueous solvent is separated, dried and the solvent removed in vacuo.

Cyclization of V to VI is effected with ammonia in a stainless steel pressure bomb. Said reaction can be run neat or in ethanol. Reaction temperatures are from about 150–200° C. for periods of 36–52 hours. The product is isolated by evaporation of the contents of the cooled reaction vessel to a semisolid residue followed by partition between water (made slightly acid with glacial acetic acid) and a solvent such as chloroform. Removal of the chloroform from the separated organic layer provides the desired 2 - alkyl-4-hydroxybenzothieno[3,2-d]pyrimidine (VI).

Conversion of VI to the final products of the present invention is carried out under the aforedescribed conditions for the preparation of compounds of the Formulae III and IV.

The novel compounds of the present invention of the formula:

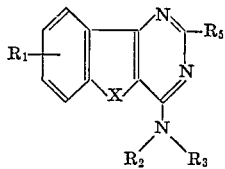

wherein $R_1$, $R_2$ and $R_3$ are as previously indicated, X is O and $R_5$ is hydrogen are synthesized via the following scheme:

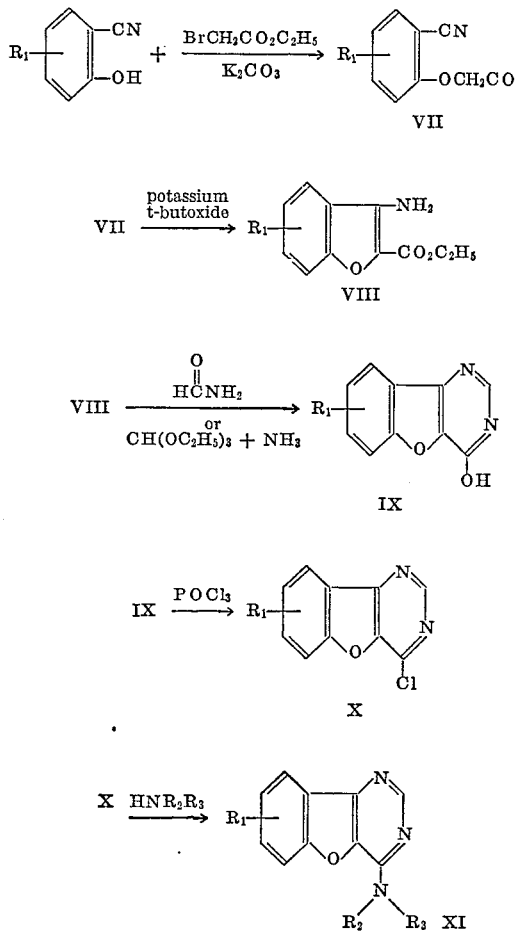

Alkylation of an appropriately substituted o-hydroxybenzonitrile with an alkyl α-haloacetate in a reaction-inert solvent in the presence of an inorganic base represents the first reaction in a series leading to compounds of Formula XI. In practice, a mixture of the requisite o-hydroxybenzonitrile, an alkyl α-haloacetate, such as ethyl bromoacetate, and potassium carbonate in equimolar amounts is heated in a suitable solvent, e.g., acetone, tetrahydrofuran or dimethylformamide, a temperatures of 50–100° C. for a period of 3 to 12 hours with vigorous stirring. The reaction mixture is cooled, filtered and the filtrate concentrated to dryness in vacuo. The residue is partitioned between water and chloroform, the chloroform layer separated and the solvent evaporated under reduced pressure. The resulting product (VII) can be further purified by recrystallization from a suitable solvent or may be chromatographed on alumina.

The appropriately substituted o-hydroxybenzonitriles are available commercially or can be prepared by one skilled in the art, e.g., as taught by Nakaoka et al., German Pat. No. 1,230,026 (C.A. 66, 55255e).

Cyclization of the requisite ethyl o-cyanophenoxyacetate to yield the substituted 2-carbethoxy-3-aminobenzofuran is effected by treatment of said phenoxyacetate with an alkali metal alkoxide, such as potassium t-butoxide in a reaction-inert solvent, e.g., tetrahydrofuran, dimethylformamide or hexamethylphosphoramide. Although the molar ratio of base to substrate can vary considerably without affecting the reaction results, it is preferable to use a ratio of 1:1. The reaction is carried out at ambient temperatures and can be controlled by the rate of addition of the substrate to the base. In general, reaction times of 30 to 60 minutes for the addition of substrate to base are operable, with 30 to 60 minutes of continued refluxing following the addition. The product is conveniently isolated by pouring the reaction mixture into water followed by acidification with glacial acetic acid and extraction with a water immiscible solvent such as chloroform. The organic layer is dried over a suitable drying agent and concentrated in vacuo. The isolated product can be used in this crude state or may be further purified by recrystallization.

Cyclization of the 2-carbethoxy-3-aminobenzofuran analogs of Formula VIII to the 4-hydroxybenzofuro[3,2-d]pyrimidine is effected by two alternate methods. The first comprises treatment of compounds related to VIII with triethyl orthoformate followed by ammonia. Experimentally, a solution of the benzofuran (VIII) in a large excess of triethyl orthoformate is heated, preferably at the reflux temperature, for a period of 2 to 4 hours. The excess orthoformate is removed in vacuo and ethanol replaced as the solvent. Ammonia gas is bubbled into the refluxing ethanol solution for 1 to 2 hours, after which the addition of ammonia is stopped and the heating continued for an additional 15 to 20 hours. The reaction mixture is concentrated in volume under reduced pressure and cooled in an ice bath. The precipitated product is filtered and air dried.

The alternate route leading to compounds of Formula IX comprises heating analogs of Formula VII in an excess of formamide at a temperature of 75–100° C. for periods of 30 to 60 minutes. Isolation of the product consists of addition of the reaction to water followed by filtration and air drying of the solids.

Functionalization of the 4-position of the benzofuro-[3,2-d]pyrimidines by reaction of the 4-hydroxy analog wtih an appropriate halogenating agent is carried out in a manner as previously described for the corresponding benzotrieno[3,2-d]pyrimidine series. Nucleophylic displacement of the 4-chloro substituent with an amine, $HNR_2R_3$, is also effected under the same conditions as previously mentioned for the thiophene derivatives.

Products of the present invention having the formula:

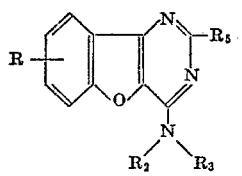

wherein $R_1$, $R_2$ and $R_3$ are as previously indicated and $R_5$ is alkyl containing from 1 to 6 carbon atoms are synthesized by experimental procedures employed for analogous congeners in the benzothieno[3,2-d]pyrimidine seires of inhibitors of platelet aggregation.

4-aminobenzothieno- and 4-aminobenzofuro[3,2-d]pyrimidines of the aforementioned formulae wherein $R_1$ is amino, $NH_2$, are most conveniently prepared via reduction of the corresponding nitro compounds. Said reduction is carried out using stannous chloride and hydrochloric acid. Experimentally, a solution of the requisite nitro analog is added to a solution of 12 N hydrochloric acid containing the stannous chloride. The solution or slurry is heated from about 40–80° C. for a period of from 2 to 4 hours. The hydrochloride salt of the product is filtered and the free base generated by treatment with an appropriate base, e.g., sodium hydroxide solution. In instances wherein the salts are soluble, the entire reaction mixture is made basic and the product extracted with a suitable solvent.

An alternate method of reduction employs the use of hydrogen and a catalyst such as platinum oxide in a reaction-inert solvent, e.g., ethanol, tetrahydrofuran or water. Said reduction is carried out in a hydrogenation vessel at an initial hydrogen pressure of 10–45 p.s.i. and at ambient temperatures. When the pressure indicates the reaction is complete, the apparatus is purged with nitrogen, the spent catalyst filtered and the solvent evaporated in vacuo to dryness. The residual product is further purified by recrystallization from a suitable solvent.

This latter method of reduction, although operable wherein the substrate is a benzofuro[3,2-d]pyrimidine, is not the preferred reduction procedure in the corresponding thiophene series due to the characteristics of sulphur containing compounds to poison noble metal catalyst.

Compounds of the instant invention wherein $R_1$ is substituted amino, said substitutent being alkylsulfonyl, acyl, benzoyl or carbalkoxy, are prepared from the requisite amino compound and the appropriate acid halide or anhydride. In practice, a solution of the aforementioned amino analog in a suitable solvent, such as tetrahydrofuran, dimethylformamide, benzene or diethylether, is treated wtih an equimolar amount, plus as much as a 20% excess, of a tertiary amine such as triethylamine, followed by the gradual addition of the acid halide or anhydride. It is advantageous to use at least an equimolar amount plus as much as a 20% excess of said acid halide or anhydride. In general, acid chlorides are the preferred acid halide used in the aforedescribed procedure. Although simple anhydrides are fully operable in the acylation procedure, mixed anhydrides can also be employed with comparable results.

Following the addition of said acid halide or anhydride the mixture is heated from about 40–75° C. for a period of 30 minutes to 2 hours. Isolation of the desired product is effected by quenching the reaction in ice and water followed by filtration and drying.

As has been previously noted, compounds of the instant invention can form acid addition salts. Basic compounds of the present invention are converted to the acid addition salts by interaction of the base with an acid either in an aqueous or non-aqueous medium. In a similar manner, treatment of the acid addition salts with an aqueous base solution, e.g., alkali metal hydroxides, alkali metal carbonates and alkali metal bicarbonates or with a metal cation which forms an insoluble precipitate with the acid anion, results in a regeneration of the free base form. Such conversions are best carried out as rapidly as possible and under temperature conditions and method dictated by the stability of said basic products. The bases thus regenerated may be reconverted to the same or a different acid addition salt.

In the utilization of the chemotherapeutic activity of those compounds of the present invention which form salts, it is preferred, of course, to use pharmaceutically-acceptable salts. Although water-insolubility, high toxicity, or lack of crystalline nature may make some particular salt species unsuitable or less desirable for use a such in a given pharmaceutical application, the water inoluble or toxic salts can be converted to the corresponding pharmaceutically-acceptable bases by decomposition of the salt as described above, or alternately they can be converted to any desired pharmaceutically-acceptable acid-addition salt.

Examples of acids which provide pharmaceutically-acceptable anions are hydrochloric, hydrobromic, hydroiodic, nitric, sulfuric, or sulfurous, phosphoric, acetic, lactic, citric, tartaric, succinic, maleic, and gluconic, As previously indicated, the benzothieno- and benzofuro[3,2-d]pyrimidines of the present invention are all readily adapted to therapeutic use as inhibitors of platelet aggregation. Typical member compounds of interest in this series include 4-diethylaminobenzothieno[3,2-d]pyrimidine, 4-(di-n-propyl)aminobenzothieno[3,2-d]pyrimidine, 4 - diethylaminobenzofuro[3,2-d]pyrimidine, 4 - (2-carboxyphenyl)aminobenzofuro[3,2-d]pyrimidine, and 4-(2-sulfamoylphenyl)aminobenzofuro[3,2-d]pyrimidine.

The terminal complication of thrombus formation in ischaemic heart disease, cerebral vascular disease, leg-vein thrombosis, pulmonary embolism and peripheral vascular disease is well documented in the medical literature, and has recently been reviewed by Poole et al., J. Atheroscler. Res. 1, 251–282 (1961). The casual role of platelet aggregation in the formation of thrombi, which are masses of agglutinated platelets and leucocytes as distinguished from clots in which the elements of the blood are randomly distributed, has been postulated by many medical studies and has been reviewed by Poole et al., and more recently by Ursprung in "Annual Reports in Medicinal Chemistry," Heinzelman Ed., Academic Press, New York, N.Y., 1965, p. 183; 1966, p. 193.

The compounds of the instant invention mediate their remarkable antithrombogenic activity through their ability to inhibit the aforementioned platelet aggregation. This ability is measured according to the method of Born et al., J. Physiol., 168, 178 (1963) and comprises the following procedure:

Anesthetized male rabbits are bled from a carotid artery into plastic centrifuge tubes containing 0.1 volume 3% sodium citrate. Platelet-rich plasma is separated by centrifugation at 100G for 10 minutes at 20° C. Plasma from 3 animals is pooled; 5 ml. samples are placed into clear plastic curvettes and stirred at 1000 r.p.m. followed by the addition of compounds of the present invention at levels of $10^{-4}$ and $10^{-6}$ moles/liter. After 10 minutes of incubation with the platelet-rich plasma at room temperature, collagen, a protein known to cause platelet aggregation, is added (0.27 ml. collagen/4 ml. plasma) and changes in the optical density are followed with a Spectronic 20 colorimeter attached to a Houston Instrument TY Recorder. Platelet aggregation is indicated by a decrease in optical density. The relative potency of the compounds of the present invention are thus rated on their ability to inhibit (percent) collagen induced platelet aggregation.

The 4-aminobenzothieno- and 4-aminobenzofuro[3,2-d] pyrimidines and the pharmaceutically acceptable salts thereof, which are useful as inhibitors of platelet aggregation, may be administered either as individual therapeutic agents or as mixtures of therapeutic agents. They may be administered alone, but are generally administered with a pharmaceutical carrier selected on the basis of the chosen route of administration and standard pharmaceutical practice. For example, they may be administered orally in the form of tablets or capsules containing such excipients as starch, milk, sugar or certain types of clay, etc. They may be administered orally in the form of elixirs or oral suspensions with the active ingredients combined with emulsifying and/or suspending agents. They may be injected parenterally, and for this use they, or appropriate derivatives, may be prepared in the form of sterile aqueous solutions. Such aqueous solutions should be suitably buffered, if necessary, and should contain other solutes such as saline or glucose to render them isotonic.

The dosage required to prevent thrombus formation in subjects prone to said disorder would be determined by the severity of the symptoms and is within the skill of the art. Generally, small doses will be administered initially, with a gradual increase in the dosage until the optimum level is determined. It will generally be found that when the composition is administered orally, larger quantities of the active ingredient will be required to produce the same level as produced by a small quantity administered parenterally. In general, from about 10 to about 200 mg. of active ingredient per kilogram of body weight are administered in single or multiple dose units, to effectively prevent thrombus formation.

The following examples are provided solely for the purpose of illustration and are not to be construed as limitations of this invention, many variations of which are possible without departing from the spirit or scope thereof.

EXAMPLE I 4-diethylaminobenzothieno[3,2-d]pyrimidine hydrochloride (A) 2 - carbomethoxy - 3-aminobenzothiophene (I; $R_1$=H).—To a solution of t-butyl alcohol (30 ml.) and potassium t-butoxide (1.12 g.; 0.01 mole) is added via a dropping funnel methyl thioglycolate (1.06 g.; 0.01 mole) in t-butyl alcohol (10 ml.). The solution is stirred for 10 minutes and then concentrated in vacuo to yield the sodium salt of methyl thioglycolate, which is taken up in 30 ml. of dimethylformamide. To this is added via a dropping funnel 2-chlorobenzonitrile (1.37 g.; 0.01 mole) in dimethylformamide (10 ml.), and the solution is warmed to 75° C. for 30 minutes. At the end of this time the solution is cooled and poured onto 200 ml. of ice and water. The resultant precipitate is filtered, washed with water and dried to yield a white microcrystalline solid, 1.8 g., M.P. 105–106° C.

(B) 4 - hydroxybenzothieno[3,2 - d]pyrimidine (II; $R_1$=H).—To a solution of 2-carbomethoxy-3-aminobenzothiophene (2.07 g.; 0.02 mole) and potassium t-butoxide (2.24 g.; 0.02 mole) in dimethylsulfoxide (30 ml.) is added an excess of formamide (ca. 5 ml./g. of 2-carbomethoxy-3-aminobenzothiophene). This is heated to 90° C. until the reaction is complete as evidenced by thin layer chromatography (~30 minutes). The solution is cooled, poured into water, acidified with glacial acetic acid and the resultant solid is filtered. Washing with isopropyl alcohol and then ether yields a white solid, 1.76 g.; M.P. 300–301° C.

(C) 4 - chlorobenzothieno[3,2-d]pyrimidine (III; $R_1$=H).—A mixture of 4 - hydroxybenzothieno[3,2-d]pyrimidine (20 g.; 0.1 mole) in phosphorous oxychloride (500 ml.) is refluxed with stirring for 4 hours. At the end of this time the solution is cooled and concentrated in vacuo to a brown semisolid, which is poured into 250 g. ice/250 ml. ammonium hydroxide solution. The resultant solid is filtered and air dried to yield a beige microcrystalline solid, 19.7 g., M.P. 139–140° C.

(D) 4 - diethylaminobenzothieno[3,2-d]pyrimidine hydrochloride (IV; $R_1$=H, $R_2$, $R_3$=$C_2H_5$).—A mixture of 4-chlorobenzothieno[3,2-d]pyrimidine (15 g.; 0.068 mole) and an excess of diethylamine in ethanol (500 ml.) is refluxed with stirring for 3 hours. The solution is cooled, poured into water (500 ml.) and extracted with chloroform. The chloroform extracts are washed with water, dried over sodium sulfate and the chloroform removed in vacuo to yield a dark oily residue. This is taken up in methanol, treated with activated charcoal, filtered, and the solvent removed in vacuo to yield an oily residue which is taken up in diethyl ether. Anhydrous hydrogen chloride gas is bubbled into this solution until precipitation ceases. Filtration yields the hydrochloride salt, 13.4 g., M.P. 226–230° C.

Analysis.—Calcd. for $C_{14}H_{16}N_3SCl$ (percent): C, 57.23; H, 5.49; N, 14.30. Found (percent): C, 56.88; H. 5.50; N, 13.97.

EXAMPLE II 4-diethylaminobenzofuro[3,2-d]pyrimidine hydrochloride (A) Ethyl 2 - cyanophenoxyacetate (VII; $R_1$=H).—A mixture of o-hydroxybenzonitrile (300 g.), ethyl bromoacetate (630 g.) and potassium carbonate (706 g.) in 10 l. of acetone is refluxed with vigorous stirring for 6 hours. The reaction mixture is cooled, filtered and the filtrate concentrated in vacuo to yield a light oily residue which crystallizes when poured onto 2 l. of water. The solid is slurried in chloroform, washed with water, and the solvent removed in vacuo to yield an oily residue. This is taken up in benzene, chromatographed on alumina and crystallized from hexane to yield the desired product, 390 g., M.P. 57° C.

(B) 2 - carbethoxy - 3 - aminobenzofuran (VIII; $R_1$=H).—To a solution of potassium t-butoxide (213 g.; 1.9 mole) in tetrahydrofuran (1 l.) is added, dropwise, ethyl 2-cyanophenoxyacetate (390 g.; 1.9 mole) in tetrahydrofuran (1.5 l.) over a 30 minute period. During this time the solution turns yellow and the reaction becomes exothermic. The reaction mixture is stirred for an additional 30 minutes at room temperature, poured into water (3 l.) and acidified with glacial acetic acid. The aqueous solution is extracted 4 times with chloroform, washed with water and dried with sodium sulfate. Evaporation of the solvent results in an oil which is treated with activated charcoal in methanol. Filtration and evaporation of the solvent results in a greenish oil, 300 g., which is used without further purification. A crystallized sample melts at 76–77° C.

(C) Hydroxybenzofuro[3,2-d]pyrimidine (IX; $R_1$=H)

A solution of 2-carboethoxy-3-aminobenzofuran (300 g.) and triethyl orthoformate (1500 ml.) is refluxed with stirring for 3 hours. The excess triethyl orthoformate is removed in vacuo to yield a brown oil, 380 g., which is taken up in ethanol (1.5 l.). Ammonia is bubbled into this mixture for 1.5 hours while the solution is refluxed. At the end of this time the addition of ammonia is stopped and the mixture refluxed an additional 16 hours. The mixture is cooled and filtered. The precipitate is washed with diethyl ether and air dried to yield the desired product, 170 g., M.P. 294–295° C.

(D) 4-chlorobenzofuro[3,2-d]pyrimidine (X; $R_1$=H)

A mixture of 4-hydroxybenzofuro[3,2-d]pyrimidine (168 g.) and phosphorous oxychloride (1.3 l.) is refluxed for 16 hours. At the end of this time the phosphorous oxychloride is removed in vacuo to yield a semisolid which is poured into ammonium hydroxide/ice (2 l.). This is filtered, washed with water and dried in vacuo to yield a tan solid, 146 g., M.P. 142–143° C.

(E) Diethylaminobenzo[3,2-d]pyrimidine hydrochloride (XI; $R_1$=H, $R_2$, $R_3$=$C_2H_5$).—A solution of 4-chlorobenzofuro[3,2-d]pyrimidine (6 g.; 0.029 mole) and diethylamine (21.4 g.; 0.29 mole) in tetrahydrofuran (150 ml.) is refluxed for 1.5 hours, cooled and poured into 200 ml. of water. The solution is extracted twice with chloroform, washed with water, dried with sodium sulfate, and the chloroform is evaporated in vacuo to yield an oil which is taken up in diethyl ether. This is chromatographed on basic alumina to yield an oil which is treated with activated charcoal and then converted to the hydrochloride salt, 5.5 g., M.P. 49–254° C. Recrystallization from ethanol yields white needles, 4.5 g., M.P. 255–256° C.

EXAMPLE III 2-methyl-4-diethylaminobenzofuro[3,2-d]pyrimidine hydrochloride (A) 2-carbethoxy-3-acetylaminobenzofuran.—To a refluxing solution of acetyl chloride (150 ml.) is added via a dropping funnel 2-carboethoxy-3-aminobenzofuran (5 g.) in dimethoxyethane (150 ml.) and triethylamine (4 ml.). The solution is refluxed for 30 minutes, cooled and then filtered. Concentration of the filtrate in vacuo yields a solid residue which is slurried in diethyl ether, filtered, washed with diethyl ether and air dried to yield the product as a white microcrystalline solid, 5.2 g., M.P. 159–160° C.

(B) 2-methyl-4-hydroxybenzofuro[3,2-d]pyrimidine.— Into a 150 ml. stainless steel pressure bomb is introduced 2-carboethoxy-3-acetylaminobenzofuran (10 g.) and a saturated ethanolic ammonia solution (180 ml.). The mixture is heated at 180° C. for 48 hours, cooled and the solution concentrated in vacuo to dryness. The residue is slurried in chloroform, filtered and air dried to yield a yellow solid, 2.5 g., M.P. 317–319° C.

(C) 2-methyl-4-chlorobenzofuro[3,2-d]pyrimidine.—2-methyl-4-hydroxybenzofuro[3,2-d]pyrimidine (3.0 g.) is taken up in excess phosphorous oxychloride and refluxed overnight. At the end of this time the phosphorous oxychloride is removed under reduced pressure and the residue poured into ice/ammonium hydroxide. The solid is filtered and taken up in chloroform, dried with sodium sulfate and the chloroform removed in vacuo. There is obtained a tan solid, 1.79 g., M.P. 116° C.

(D) 2 - methyl - 4 - diethylaminobenzofuro[3,2-d]pyrimidine hydrochloride.—2 - methyl - 4 - chlorobenzofuro[3,2-d]pyrimidine (1.75 g.) is taken up in anhydrous ethanol (30 ml.), treated with an excess of diethylamine and refluxed for 2 hours. At the end of this time the solvent is removed in vacuo and the residue taken up in methylene chloride, washed with water and dried over sodium sulfate. The solvent is removed in vacuo to yield an oil which is taken up in diethyl ether and converted to the hydrochloride salt, 1.7 g., M.P., 245–246° C.

EXAMPLE IV

Following the procedures in Examples II and III, and starting with the appropriate reagents, the following compounds are prepared:

4 - aminobenzofuro[3,2 - d]pyrimidine hydrochloride, M.P. 242–243° C.;

4 - methylaminobenzofuro[3,2-d]pyrimidine hydrochloride, M.P. 230–231° C.;

4 - ethylaminobenzofuro[3,2-d]pyrimidine hydrochloride, M.P. 241–242° C.;

4 - dimethylaminobenzofuro[3,2-d]pyrimidine hydrochloride, M.P. 292–295° C.;

4 - di-n-propylaminobenzofuro[3,2-d]pyrimidine hydrochloride, M.P. 190–191° C.;

4 - (β-hydroxyethyl)aminobenzofuro[3,2-d]pyrimidine hydrochloride, M.P. 251–252° C.;

4 - (N - methyl - N - carboxymethylamino)benzofuro[3,2-d]pyrimidine, M.P. 253–254° C.;

4 - cyclohexylaminobenzofuro[3,2-d]pyrimidine hydrochloride, M.P. 238–240° C.;

2 - methyl - 4 - di-n-propylaminobenzofuro[3,2-d]pyrimidine hydrochloride, M.P. 207–209° C.;

4 - (dimethylaminoethylamino)benzofuro[3,2 - d]pyrimidine hydrochloride, M.P. 180–182° C. dec.

EXAMPLE V

The procedures of Example II are repeated, using equivalent amounts of the requisite starting materials, to provide the following analogs:

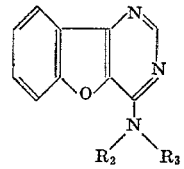

| $R_2$ | $R_3$ | $R_2$ | $R_3$ |
|---|---|---|---|
| H | i-$C_3H_7$ | Cyclo $C_3H_5$ | H |
| H | t-$C_4H_9$ | Cyclo $C_5H_9$ | H |
| H | n-$C_5H_{11}$ | Cyclo $C_7H_{13}$ | H |
| $CH_3$ | n-$C_6H_{13}$ | Cyclo $C_6H_{11}$ | $CH_3$ |
| $CH_3$ | s-$C_4H_9$ | Cyclo $C_7H_{13}$ | $CH_3$ |
| $CH_3$ | n-$C_3H_7$ | Cyclo $C_3H_5$ | $CH_3$ |
| $C_2H_5$ | i-$C_3H_7$ | Cyclo $C_3H_5$ | n-$C_4H_9$ |
| $C_2H_5$ | n-$C_4H_9$ | Cyclo $C_6H_{11}$ | n-$C_4H_9$ |
| $C_2H_5$ | n-$C_6H_{13}$ | Cyclo $C_5H_9$ | n-$C_4H_9$ |
| n-$C_3H_7$ | i-$C_3H_7$ | Cyclo $C_5H_9$ | Cyclo $C_3H_5$ |
| n-$C_3H_7$ | t-$C_4H_9$ | Cyclo $C_3H_5$ | Cyclo $C_3H_5$ |
| i-$C_3H_7$ | n-$C_6H_{13}$ | Cyclo $C_5H_9$ | Cyclo $C_5H_9$ |
| n-$C_4H_9$ | n-$C_4H_9$ | | |
| n-$C_5H_{11}$ | n-$C_5H_{11}$ | | |
| n-$C_6H_{13}$ | n-$C_6H_{13}$ | | |

EXAMPLE VI

The procedures of Examples II and III are again repeated starting with equivalent amounts of the appropriate starting materials to provide the following congeners:

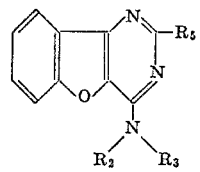

| $R_2$ | $R_3$ | $R_5$ |
|---|---|---|
| —$CH_2CH(CO_2H)CH_3$ | H— | H— |
| —$(CH_2)_3OH$ | H— | H— |
| —$CH(CH_3)CH_2CO_2H$ | H— | H— |
| —$(CH_2)_3N(CH_3)_2$ | $CH_3$— | H— |
| —$(CH_2)_5N(C_2H_5)_2$ | $CH_3$— | H— |
| —$(CH_2)_3CO_2H$ | $CH_3$— | $CH_3$— |
| —$(CH_2)_2N(C_3H_7)_2$ | $CH_3$— | $CH_3$— |
| —$(CH_2)_3OH$ | $C_2H_5$— | $CH_3$— |
| —$(CH_2)_6N(CH_3)_2$ | $C_2H_5$— | $CH_3$— |
| —$CH_2CH(CH_3)CH_2CO_2H$ | $C_2H_5$— | $C_2H_5$— |
| —$CH_2CH(OH)C_2H_5$ | n-$C_3H_7$— | $C_2H_5$— |
| —$(CH_2)_2N(C_3H_7)_2$ | n-$C_3H_7$— | $C_2H_5$— |
| —$(CH_2)_3OH$ | H— | $C_2H_5$— |
| —$CH_2CH(CO_2H)CH_3$ | H— | n-$C_4H_9$— |
| —$(CH_2)_2N(C_2H_5)_2$ | H— | n-$C_4H_9$— |
| —$(CH_2)_2N(C_2H_5)_2$ | $CH_3$— | n-$C_4H_9$— |
| —$(CH_2)_2N(CH_3)_2$ | $(CH_3)_2N(CH_2)_2$— | H— |
| —$(CH_2)_2OH$ | $HO(CH_2)_2$— | H— |
| —$(CH_2)_3OH$ | $(CH_3)_2N(CH_2)_2$— | $CH_3$— |

EXAMPLE VII

The procedures of Example I are repeated, using the appropriate starting reagents, to provide the following compounds:

4 - dimethylaminobenzothieno[3,2-d]pyrimidine hydrochloride, M.P. 299–301° C.;

4-di-n-propylaminobenzothieno[3,2 - d]pyrimidine hydrochloride, M.P. 202–203° C.;

4-di-n-butylaminobenzothieno[3,2-d]pyrimidine hydrochloride, M.P. 183–185° C.;

4 - (bis - β - hydroxyethyl)aminobenzothieno[3,2 - d]pyrimidine hydrochloride, M.P. 197° C.;

4 - (dimethylaminoethyl)aminobenzothieno[3,2 - d]pyrimidine hydrochloride, M.P. 284° C.;

4-aminobenzothieno[3,2 - d]pyrimidine hydrochloride, M.P. 266° C.;

4 - methylaminobenzothieno[3,2-d]pyrimidine hydrochloride, M.P. 267–271° C.

EXAMPLE VIII

Following the procedures of Example I and employing the requisite starting materials, the following compounds are prepared:

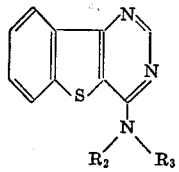

| $R_2$ | $R_3$ | $R_2$ | $R_3$ |
|---|---|---|---|
| H | H | Cyclo $C_6H_{11}$ | H |
| $CH_3$ | H | Cyclo $C_7H_{13}$ | H |
| n-$C_3H_7$ | H | Cyclo $C_3H_5$ | $CH_3$ |
| n-$C_6H_{13}$ | H | Cyclo $C_6H_{11}$ | $C_2H_5$ |
| —$(CH_2)_2OH$ | $CH_3$— | Cyclo $C_6H_{11}$ | —$(CH_2)_2N(CH_3)_2$ |
| —$CH_2CO_2H$ | $CH_3$— | Cyclo $C_3H_5$ | —$(CH_2)_2N(CH_3)_2$ |
| —$(CH_2)_2CO_2H$ | $CH_3$— | Cyclo $C_6H_{11}$ | —$(CH_2)_2CO_2H$ |
| —$(CH_2)_2CO_2H$ | $C_2H_5$— | Cyclo $C_6H_{11}$ | —$(CH_2)_2OH$ |
| —$(CH_2)_2OH$ | $C_2H_5$— | Cyclo $C_3H_5$ | Cyclo $C_3H_5$ |
| —$(CH_2)_2N(CH_3)_2$ | $C_2H_5$— | Cyclo $C_6H_{11}$ | $CH_3$ |
| —$(CH_2)_2N(CH_3)_2$ | i-$C_3H_7$— | Cyclo $C_6H_{11}$ | i-$C_3H_7$ |
| —$CH_2CH(CH_3)CH_2OH$ | i-$C_3H_7$— | Cyclo $C_6H_{11}$ | t-$C_4H_9$ |
| —$(CH_2)_3N(C_2H_5)_2$ | i-$C_3H_7$— | | |
| —$(CH_2)_3N(C_2H_5)_2$ | n-$C_5H_{11}$— | | |
| —$(CH_2)_2OH$ | $HO(CH_2)_2$— | | |

EXAMPLE IX

The procedures of Examples I and II are again repeated, using equivalent amounts of the requisite starting reagents, to provide the following analogs:

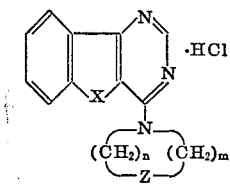

| X | n | m | Z | Melting point, °C. |
|---|---|---|---|---|
| O | 2 | 2 | $CH_2$ | 255–259 |
| O | 2 | 1 | $CH_2$ | 306–308 |
| O | 3 | 3 | $CH_2$ | 195–196 |
| S | 2 | 2 | O | 257–259 |
| S | 1 | 2 | $CH_2$ | 307–309 |
| S | 2 | 2 | $CH_2$ | 260–262 |
| S | 3 | 3 | $CH_2$ | 216–217 |
| S | 2 | 2 | $N(CH_3)$ | 292 [1] |
| O | 2 | 2 | $NCO_2CH_2CH(CH_3)_2$ | 218–219 |
| O | 2 | 2 | $N(CH_3)$ | >305 |
| O | 3 | 2 | $CH_2$ | 195–196 |

[1] Decomposition.

EXAMPLE X

N-(4-benzofuro[3,2-d]pyrimidinyl)anthranilic acid

To a solution of 4.04 g. (0.02 mole) of 4-chlorobenzofuro[3,2-d]pyrimidine in 150 ml. of absolute ethanol is added g. 0.038 mole) of ethyl anthranilate and the resulting solution heated to reflux overnight. The reaction mixture is cooled, and the resulting precipitate filtered, washed with water and dried. The desired product, ethyl N-(4-benzofuro[3,2-d]pyrimidinyl)anthranilate, 7.5 g., M.P. 158° C., is used without further purification.

The above ester, 1.29 g. (5 mmoles), is added to 5 ml. of 1 N sodium hydroxide solution and the resulting solution diluted with 90 ml. of water and 30 ml. of dimethylsulfoxide. The reaction mixture is heated to reflux overnight and is then cooled. The resulting precipitate is filtered, dissolved in a minimum amount of water and acidified with glacial acetic acid. The acidified solution is extracted with chloroform and the chloroform layer separated, dried over sodium sulfate and concentrated in vacuo to provide the desired product, M.P. >300° C.

EXAMPLE XI 4-(o-sulfamoylphenylamino)benzofuro[3,2-d]pyrimidine

To a solution of 1.96 g. (9.6 mmoles) of 4-chlorobenzofuro[3,2-d]pyrimidine in ethanol is added 1.58 g. (9.2 mmoles) of o-aminobenzenesulfonamide and the mixture refluxed for 5 hours. The precipitate which forms during the reaction period is filtered from the cooled reaction mixture, washed with water and dried, 2.0 g., M.P. 227–278° C.

EXAMPLE XII

Following the synthetic procedures of Examples X and XI, and employing the appropriate starting materials, the following congeners are prepared:

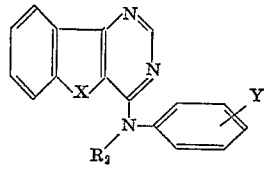

| X | $R_2$ | Y |
|---|---|---|
| O | H | 3-$SO_2NH_2$ |
| O | H | H |
| O | H | 4-$SO_2NH_2$ |
| O | H | 3-$CO_2H$ |
| O | H | 4-$CO_2H$ |
| O | H | 2-$CO_2NH_2$ |
| O | H | 3-$CO_2NH_2$ |
| O | H | 4-$CO_2NH_2$ |
| O | $CH_3$ | H |
| O | $CH_3$ | 2-$SO_2NH_2$ |
| O | $CH_3$ | 4-$SO_2NH_2$ |
| O | $CH_3$ | 2-$CO_2H$ |
| O | $CH_3$ | 2-$CO_2NH_2$ |
| O | $CH_3$ | 4-$CO_2NH_2$ |
| O | n-$C_3H_7$ | H |
| O | n-$C_3H_7$ | 2-$SO_2NH_2$ |
| O | n-$C_3H_7$ | 4-$SO_2NH_2$ |
| O | n-$C_3H_7$ | 2-$CO_2H$ |
| O | n-$C_3H_7$ | 3-$CO_2H$ |
| O | n-$C_3H_7$ | 2-$CO_2NH_2$ |
| O | n-$C_6H_{13}$ | H |
| O | n-$C_6H_{13}$ | 2-$SO_2NH_2$ |
| O | n-$C_6H_{13}$ | 2-$CO_2H$ |
| O | n-$C_6H_{13}$ | 2-$CO_2NH_2$ |
| S | H | 2-$SO_2NH_2$ |
| S | H | 2-$CO_2H$ |
| S | H | 2-$CO_2NH_2$ |
| S | H | 3-$CO_2NH_2$ |
| S | $C_2H_5$ | 2-$SO_2NH_2$ |
| S | $C_2H_5$ | 3-$SO_2NH_2$ |
| S | $C_2H_5$ | 2-$CO_2H$ |
| S | s-$C_4H_9$ | 2-$SO_2NH_2$ |
| S | s-$C_4H_9$ | 2-$CO_2H$ |
| S | n-$C_5H_{11}$ | 2-$SO_2NH_2$ |

EXAMPLE XIII

The procedure of Example XI is repeated, using the requisite starting reagents, to provide the following compounds:

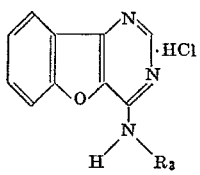

| $R_3$: | M.P., °C. |
|---|---|
| 2-pyridyl | 272-724. |
| 3-pyridyl | 175-178, dec. |
| 4-pyridyl | 295-305, dec. |
| 5-methyl-2-pyridyl | 269-271. |
| 4-methyl-2-pyridyl | 288-290. |
| 4,6-dimethyl-3-pyrimidyl | 150-155. |
| 2,6-dimethyl-4-pyrimidyl | 270, dec. |

EXAMPLE XIV

The procedures of Examples X and XI are again repeated, using the appropriately substituted starting reagents, to provide the following analogs:

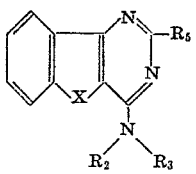

| X | $R_2$ | $R_3$ | $R_5$ |
|---|---|---|---|
| O | HO(CH$_2$)$_2$— | Phenyl | H |
| O | HO(CH$_2$)$_2$— | 3-carboxy-2-pyridyl | H |
| O | HO(CH$_2$)$_3$— | 2-carboxamido-4-pyridyl | H |
| O | HO$_2$CCH$_2$— | 3-carboxy-4-pyridyl | H |
| O | HO$_2$C(CH$_2$)$_3$— | 2-carboxyphenyl | CH$_3$ |
| O | HO(CH$_2$)$_4$— | 2-sulfamoylphenyl | CH$_3$ |
| S | HO$_2$C(CH$_2$)$_2$— | Phenyl | H |
| S | HO$_2$C(CH$_2$)$_2$— | 2-sulfamoylphenyl | H |
| S | HO$_2$C(CH$_2$)$_2$— | 2-carboxyphenyl | H |
| S | HO(CH$_2$)$_2$— | 3-carboxy-2-pyridyl | H |
| S | HO(CH$_2$)$_3$— | 2-carboxamido-4-pyridyl | H |
| S | HO(CH$_2$)$_3$— | ....do.... | C$_2$H$_5$ |
| S | HO$_2$CCH$_2$— | 3-carboxy-4-pyridyl | C$_2$H$_5$ |
| S | HO$_2$C(CH$_2$)$_3$— | 2-carboxyphenyl | C$_2$H$_5$ |
| S | HO$_2$C(CH$_2$)$_2$— | Phenyl | C$_2$H$_5$ |

EXAMPLE XV

The procedures of Example I are repeated, starting with the appropriately substituted reagents, to provide, in moderately good yields, the following compounds:

4-amino-8-trifluoromethylbenzothieno[3,2-d]pyrimidine hydrochloride, M.P. 252-253° C.;
4-ethylamino-8-trifluoromethylbenzothieno[3,2-d]pyrimidine hydrochloride, M.P. 242-244° C;.
4-diethylamino-8-trifluoromethylbenzothieno[3,2-d]pyrimidine hydrochloride, M.P. 205-207° C.;
4-di-n-propylamino-8-trifluoromethylbenzothieno[3,2-d]pyrimidine hydrochloride, M.P. 278-280° C.;
4-(dimethylaminoethylamino)-8-trifluoromethylbenzothieno[3,2-d]pyrimidine hydrochloride, M.P. 268-270° C.;
4-(4-morpholinyl)-8-trifluoromethylbenzothieno[3,2-d]pyrimidine hydrochloride, M.P. 264-266° C.;
4-(4-methyl-1-piperizinyl)-8-trifluoromethylbenzothieno[3,2-d]pyrimidine hydrochloride, M.P. 281-284° C.;
4-dimethylamino-8-trifluoromethylbenzothieno[3,2-d]pyrimidine hydrochloride, M.P. 284-285° C.;
4-dimethylamino-8-trifluoromethylbenzothieno[3,2-d]pyrimidine hydrochloride, M.P. 260-262° C.;
4-(2-carbethoxyphenylamino)-8-trifluoromethylbenzothieno[3,2-d]pyrimidine hydrochloride, M.P. 176-177° C.;
4-(azacycloheptyl)-8-trifluoromethylbenzothieno[3,2-d]pyrimidine hydrochloride, M.P. 230-231° C.;
4-diethylamino-8-nitrobenzothieno[3,2-d]pyrimidine hydrochloride, M.P. 224° C.;
4-bis(β-hydroxyethyl)amino-8-nitrobenzothieno[3,2-d]pyrimidine hydrochloride, M.P. 187° C.;
4-di-n-propylamino-8-nitrobenzothieno[3,2-d]pyrimidine hydrochloride, M.P. 225-228° C.

EXAMPLE XVI

Starting with the appropriately substituted reagents and employing the procedures of Examples I and II, the following congeners are synthesized:

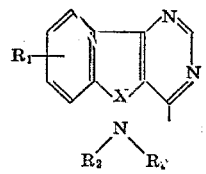

| $R_1$ | X | $R_2$ | $R_3$ |
|---|---|---|---|
| 6-F | O | H | H |
| 6-F | O | H | CH$_3$ |
| 6-F | O | CH$_3$ | CH$_3$ |
| 6-F | O | C$_2$H$_5$ | CH$_3$ |
| 6-F | O | C$_2$H$_5$ | H |
| 6-Cl | O | H | H |
| 6-Cl | O | n-C$_3$H$_7$ | H |
| 6-Cl | O | n-C$_3$H$_7$ | CH$_3$ |
| 6-Cl | O | n-C$_3$H$_7$ | n-C$_3$H$_7$ |
| 6-Cl | O | CH$_3$ | n-C$_6$H$_{13}$ |
| 6-Br | O | CH$_3$ | H |
| 6-Br | O | i-C$_3$H$_7$ | CH$_3$ |
| 7-F | O | H | H |
| 7-F | O | CH$_3$ | CH$_3$ |
| 7-F | O | C$_2$H$_5$ | C$_2$H$_5$ |
| 7-Cl | O | C$_2$H$_5$ | H |
| 7-Cl | O | n-C$_3$H$_7$ | n-C$_3$H$_7$ |
| 7-Br | O | C$_2$H$_5$ | C$_2$H$_5$ |
| 7-Br | O | H | n-C$_6$H$_{13}$ |
| 8-F | O | H | H |
| 8-F | O | H | t-C$_4$H$_9$ |
| 8-F | O | CH$_3$ | C$_2$H$_5$ |
| 8-Cl | O | CH$_3$ | H |
| 8-Cl | O | CH$_3$ | CH$_3$ |
| 9-F | O | H | H |
| 9-F | O | CH$_3$ | C$_2$H$_5$ |
| 9-F | O | n-C$_3$H$_7$ | n-C$_3$H$_7$ |
| 9-F | O | CH$_3$ | n-C$_5$H$_{11}$ |
| 9-Cl | O | C$_2$H$_5$ | C$_2$H$_5$ |
| 9-Cl | O | C$_2$H$_5$ | n-C$_4$H$_9$ |
| 9-Br | O | H | H |
| 9-Br | O | CH$_3$ | H |
| 9-Br | O | s-C$_4$H$_9$ | H |
| 6-F | S | H | H |
| 6-F | S | C$_2$H$_5$ | C$_2$H$_5$ |
| 6-Cl | S | C$_2$H$_5$ | C$_2$H$_5$ |
| 6-Br | S | H | C$_2$H$_5$ |
| 6-Br | S | C$_2$H$_5$ | CH$_3$ |
| 6-Br | S | C$_2$H$_5$ | C$_2$H$_5$ |
| 7-F | S | C$_2$H$_5$ | C$_2$H$_5$ |
| 7-Cl | S | H | H |
| 7-Cl | S | CH$_3$ | CH$_3$ |
| 8-F | S | CH$_3$ | C$_2$H$_5$ |
| 8-F | S | C$_2$H$_5$ | C$_2$H$_5$ |
| 8-Cl | S | C$_2$H$_5$ | C$_2$H$_5$ |
| 8-Br | S | H | H |
| 8-Br | S | CH$_3$ | H |
| 8-Br | S | CH$_3$ | CH$_3$ |
| 8-Br | S | C$_2$H$_5$ | n-C$_3$H$_7$ |
| 9-F | S | H | H |
| 9-F | S | CH$_3$ | CH$_3$ |
| 9-F | S | i-C$_3$H$_7$ | i-C$_3$H$_7$ |
| 9-Cl | S | C$_2$H$_5$ | C$_2$H$_5$ |
| 9-Br | S | CH$_3$ | CH$_3$ |

EXAMPLE XVII

The procedures of Examples I and II are repeated, using appropriately substituted starting material, to yield the following analogs in good yields:

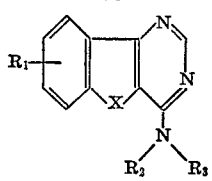

| R₁ | X | R₂ | R₃ |
|---|---|---|---|
| 6-OH | O | H | H |
| 6-OH | O | CH₃ | CH₃ |
| 6-OH | O | Cyclo C₅H₉ | CH₃ |
| 6-OCH₃ | O | H | n-C₃H₇ |
| 6-OCH₃ | O | Cyclo C₆H₁₁ | C₂H₅ |
| 6-OCH₃ | O | —(CH₂)₆— | |
| 7-OH | O | —(CH₂)₆— | |
| 7-OH | O | —(CH₂)₅— | |
| 7-OH | O | —(CH₂)₂O(CH₂)₂— | |
| 7-OH | O | Cyclo C₇H₁₃ | H |
| 7-OH | O | Cyclo C₃H₅ | CH₃ |
| 7-OCH₃ | O | —(CH₂)₆— | |
| 7-OCH₃ | O | —(CH₂)₂N(CH₃)(CH₂)₂— | |
| 7-OCH₃ | O | H | n-C₆H₁₃ |
| 7-OCH₃ | O | —(CH₂)N(CO₂CH₃)(CH₂)₂— | |
| 7,8-(OCH₃)₂ | O | H | H |
| 7,8-(OCH₃)₂ | O | CH₃ | C₂H₅ |
| 7,8-(OCH₃)₂ | O | —(CH₂)₆— | |
| 7,8-(OCH₃)₂ | O | Cyclo C₆H₁₁ | H |
| 8-OCH₃ | O | H | CH₃ |
| 8-OCH₃ | O | —(CH₂)₂S(CH₂)₂— | |
| 8-OCH₃ | O | Cyclo C₃H₅ | CH₃ |
| 8-OCH₃ | O | Cyclo C₃H₅ | Cyclo C₃H₅ |
| 8-OCH₃ | O | —(CH₂)₅— | |
| 8-OCH₃ | O | —(CH₂)₇— | |
| 9-OH | O | H | H |
| 9-OH | O | CH₃ | n-C₅H₁₁ |
| 9-OH | O | —(CH₂)₅— | |
| 9-OCH₃ | O | Cyclo C₆H₁₁ | H |
| 9-OCH₃ | O | Cyclo C₆H₁₁ | CH₃ |
| 9-OCH₃ | O | —(CH₂)₂NH(CH₂)₂— | |
| 9-OCH₃ | O | —(CH₂)₆— | |
| 6-OH | S | —(CH₂)₆— | |
| 6-OH | S | CH₃ | CH₃ |
| 6-OH | S | Cyclo C₆H₁₁ | CH₃ |
| 6-OCH₃ | S | C₂H₅ | C₂H₅ |
| 6-OCH₃ | S | Cyclo C₄H₇ | CH₃ |
| 6-OCH₃ | S | Cyclo C₇H₁₃ | H |
| 7-OH | S | —(CH₂)₆— | |
| 7-OH | S | —(CH₂)₆— | |
| 7-OH | S | CH₃ | CH₃ |
| 7-OH | S | Cyclo C₇H₁₃ | CH₃ |
| 7-OCH₃ | S | H | H |
| 7-OCH₃ | S | CH₃ | H |
| 7-OCH₃ | S | n-C₅H₁₁ | CH₃ |
| 7-OCH₃ | S | Cyclo C₆H₁₁ | CH₃ |
| 7,8-(OCH₃)₂ | S | C₂H₅ | C₂H₅ |
| 7,8-(OCH₃)₂ | S | —(CH₂)₅— | |
| 7,8-(OCH₃)₂ | S | Cyclo C₆H₁₁ | CH₃ |
| 8-OH | S | C₂H₅ | C₂H₅ |
| 8-OH | S | Cyclo C₇H₁₃ | H |
| 8-OH | S | —(CH₂)₂O(CH₂)₂— | |
| 8-OH | S | —(CH₂)₂S(CH₂)₂— | |
| 8-OCH₃ | S | CH₃ | CH₃ |
| 8-OCH₃ | S | —(CH₂)₆— | |
| 9-OH | S | H | H |
| 9-OH | S | H | H |
| 9-OH | S | C₂H₅ | CH₃ |
| 9-OH | S | Cyclo C₃H₅ | CH₃ |
| 9-OCH₃ | S | H | H |
| 9-OCH₃ | S | CH₃ | H |
| 9-OCH₃ | S | C₂H₅ | C₂H₅ |
| 9-OCH₃ | S | —(CH₂)₄— | |
| 9-OCH₃ | S | —(CH₂)₂N(CO₂C₂H₅)(CH₂)₂— | |

EXAMPLE XVIII 4-diethylamino-8-aminobenzothieno[3,2-d]pyrimidine hydrochloride To 15 ml. of 12 N hydrochloric acid solution is added 2 g. of stannous chloride followed by 1 g. (3.5 mmoles) of 4 - diethylamino - 8-nitrobenzothieno[3,2-d]pyrimidine over a period of 10 minutes. After warming the slurry at 60° C. for 3 hours, it is allowed to stir at room temperature overnight. The solids are filtered, washed with a small amount of 12 N hydrochloric acid and dissolved in a minimum amount of water. Ten percent sodium hydroxide is added to basify the solution and the product is extracted with chloroform. The organic layer is separated, dried over sodium sulfate and concentrated to an oil under reduced pressure. The residual oil is dissolved in ethyl acetate and treated with sufficient gaseous hydrogen chloride to complete the formation of the hydrochloride salt, which is filtered and dried, 800 mg.

EXAMPLE XIX

The procedures of Examples I and II are repeated, using the requisite starting reagents, and the resulting products subjected to the reduction procedure of Example XVIII to provide the following congeners:

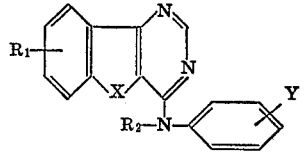

| R₁ | X | R₂ | Y |
|---|---|---|---|
| 6-NO₂ | O | H | 2-SO₂NH₂ |
| 6-NH₂ | O | H | 2-SO₂NH₂ |
| 6-NO₂ | O | n-C₄H₉ | 2-SO₂NH₂ |
| 6-NH₂ | O | n-C₄H₉ | 2-SO₂NH₂ |
| 7-NO₂ | S | CH₃ | 4-SO₂NH₂ |
| 7-NH₂ | S | CH₃ | 4-SO₂NH₂ |
| 7-NO₂ | S | H | 2-SO₂NH₂ |
| 7-NH₂ | S | H | 2-SO₂NH₂ |
| 7-NO₂ | O | i-C₃H₇ | 2-CO₂H |
| 7-NH₂ | O | i-C₃H₇ | 2-CO₂H |
| 8-NO₂ | O | n-C₄H₉ | 2-CONH₂ |
| 8-NH₂ | O | n-C₄H₉ | 2-CONH₂ |
| 8-NO₂ | S | H | 3-SO₂NH₂ |
| 8-NH₂ | S | H | 3-SO₂NH₂ |
| 8-NO₂ | S | C₂H₅ | 4-CONH₂ |
| 9-NO₂ | S | C₅H₅ | 4-CONH₂ |
| 9-NO₂ | S | CH₃ | 2-SO₂NH₂ |
| 9-NH₂ | S | CH₃ | 2-SO₂NH₂ |
| 9-NO₂ | O | H | 4-CO₂H |
| 9-NH₂ | O | H | 4-CO₂H |
| 9-NO₂ | O | CH₃ | 3-CO₂H |
| 9-NH₂ | O | CH₃ | 3-CO₂H |

EXAMPLE XX 4-diethylamino-8-acetylaminobenzothieno[3,2-d] pyrimidine hydrochloride To a solution of 2.6 g. (0.01 mole) of 4-diethylamino-8-aminobenzothieno[3,2-d]pyrimidine in 25 ml. of dry dimethylformamide is added 1.1 g. (0.011 mole) of triethylamine followed by the dropwise addition of .85 g. (0.011 mole) of acetyl chloride. The resulting reaction mixture is warmed on a water bath at 50–60° C. for 30 minutes and is then allowed to cool to room temperature. Ice and water are added to the cooled reaction and the resulting precipitate extracted into chloroform. Dry hydrogen chloride gas is bubbled into the solvent until a precipitate of the hydrochloride ceases to form. The product is filtered, dried and recrystallized from ethanol.

EXAMPLE XXI

The procedure of Example XX is repeated, using the appropriate starting reagents, to provide the following compounds:

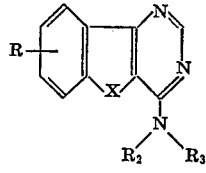

| R₁ | X | R₂ | R₃ |
|---|---|---|---|
| 6-CH₃CONH— | O | H | H |
| 6-CH₃CONH— | O | CH₃ | H |
| 6-CH₃CONH— | O | n-C₃H₇ | n-C₃H₇ |
| 6-n-C₃H₇CONH— | O | C₂H₅ | C₂H₅ |
| 6-CH₃SO₂NH— | O | —(CH₂)₅— | |
| 6-CH₃SO₂NH— | O | i-C₃H₇ | CH₃ |
| 6-CH₃SO₂NH— | O | n-C₆H₁₃ | n-C₆H₁₃ |
| 6-n-C₃H₇SO₂NH— | O | —(CH₂)₇— | |
| 6-C₂H₅O₂CNH— | O | C₂H₅ | C₂H₅ |
| 6-C₂H₅CONH— | O | CH₃ | H |
| 6-C₂H₅CONH— | O | CH₃ | CH₃ |
| 6-C₂H₅CONH— | O | —(CH₂)₄— | |
| 7-C₂H₅CONH— | O | —(CH₂)₅— | |
| 7-CH₃SO₂NH— | O | i-C₃H₇ | CH₃ |
| 7-CH₃SO₂NH— | O | Cyclo C₆H₁₁ | H |
| 7-CH₃SO₂NH— | O | Cyclo C₆H₁₁ | CH₃ |
| 7-CH₃O₂CNH— | O | CH₃ | CH₃ |
| 7-CH₃O₂CNH— | O | —(CH₂)₂O(CH₂)₂— | |
| 7-CH₃O₂CNH— | O | —(CH₂)₄— | |
| 7-C₂H₅CONH— | O | —(CH₂)₂O(CH₂)₂— | |
| 8-HCONH— | O | CH₃ | CH₃ |
| 8-i-C₃H₇SO₂NH— | O | Cyclo C₇H₁₃ | C₂H₅ |
| 8-i-C₃H₇SO₂NH— | O | —(CH₂)₂S(CH₂)₂— | |
| 8-n-C₃H₇O₂CNH— | O | —(CH₃)₂S(CH₂)₂— | |
| 8-n-C₃H₇O₂CNH— | O | —(CH₂)₂N(CH₃)(CH₂)₂— | |
| 9-CH₃CONH— | O | C₂H₅ | C₂H₅ |

TABLE—Continued

| R₁ | X | R₂ | R₃ |
|---|---|---|---|
| 9-CH₃CONH— | O | H | 2-HO₂CC₆H₄ |
| 9-CH₃CONH— | O | H | 2-H₂NO₂SC₆H₄ |
| 9-CH₃COHN— | O | —(CH₂)₅— | |
| 9-CH₃SO₂NH— | O | C₂H₅ | C₂H₅ |
| 9-CH₃SO₂NH— | O | —(CH₂)₆— | |
| 9-CH₃SO₂NH— | O | Cyclo C₃H₅ | CH₃ |
| 9-C₂H₅O₂CNH— | O | C₂H₅ | C₂H₅ |
| 6-CH₃CONH— | S | C₂H₅ | CH₃ |
| 6-CH₃CONH— | S | H | CH₃ |
| 6-CH₃CONH— | S | —(CH₂)₅— | |
| 6-CH₃SO₂NH— | S | C₂H₅ | C₂H₅ |
| 6-CH₃SO₂NH— | S | H | C₆H₅ |
| 6-CH₃SO₂NH— | S | H | H |
| 7-C₆H₅CONH— | S | CH₃ | CH₃ |
| 7-C₆H₅CONH— | S | H | 2-HO₂CC₆H₄ |
| 7-CH₃CONH— | S | H | 2-HO₂CC₆H₄ |
| 7-CH₃CONH— | S | H | 2-H₂NO₂SC₆H₄ |
| 7-CH₃CONH— | S | H | s-C₄H₉ |
| 7-n-C₄H₉SO₂NH— | S | C₂H₅ | C₂H₅ |
| 7-n-C₅H₁₁O₂CNH— | S | C₂H₅ | C₂H₅ |
| 7-n-C₅H₁₁O₂CNH— | S | —(CH₂)₄— | |
| 8-CH₃CONH— | S | —(CH₂)₄— | |
| 8-CH₃CONH— | S | CH₃ | 4-H₂NCOC₆H₄ |
| 8-CH₃CONH— | S | H | 4-H₂NCOC₆H₄ |
| 8-C₆H₅CONH— | S | —(CH₂)₂O(CH₂)₂— | |
| 9-CH₃CONH— | S | C₂H₅ | C₂H₅ |
| 9-CH₃CONH— | S | H | 2-HO₂CC₆H₄ |
| 9-CH₃CONH— | S | H | 2-H₂NO₂SC₆H₄ |
| 9-CH₃CONH— | S | —(CH₂)₆— | |
| 9-CH₃SO₂NH— | S | Cyclo C₆H₉ | CH₃ |
| 9-CH₃SO₂NH— | S | n-C₅H₁₁ | CH₃ |
| 9-CH₂SO₂NH— | S | H | 2-H₂NSO₂C₆H₄ |

EXAMPLE XXII

The procedures of Examples I and II are repeated, using the appropriately substituted starting materials, to provide the following compounds:

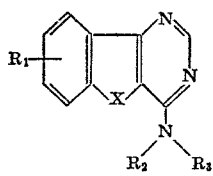

| R₁ | X | R₂ | R₃ |
|---|---|---|---|
| 6-N(CH₃)₂ | O | H— | H— |
| 6-N(CH₃)₂ | O | H— | CH₃— |
| 6-N(CH₃)₂ | O | H— | C₆H₅— |
| 6-N(CH₃)₂ | O | CH₃— | CH₃— |
| 6-N(CH₃)₂ | O | —(CH₂)₅— | |
| 7-N(CH₃)₂ | O | C₂H₅— | C₂H₅— |
| 7-N(CH₃)₂ | O | C₂H₅— | C₆H₅— |
| 7-N(CH₃)₂ | O | C₂H₅— | HO(CH₂)₂— |
| 7-N(CH₃)₂ | O | HO(CH₂)₂— | HO(CH₂)₂— |
| 8-N(CH₃)₂ | O | H— | 2-pyridyl |
| 8-N(CH₃)₂ | O | CH₃— | 2-pyridyl |
| 8-N(CH₃)₂ | O | CH₃— | i-C₃H₇— |
| 8-N(CH₃)₂ | O | Cyclo C₆H₁₁— | CH₃— |
| 9-N(CH₃)₂ | O | H— | n-C₃H₇— |
| 9-N(CH₃)₂ | O | CH₃— | C₂H₅— |
| 9-N(CH₃)₂ | O | C₂H₅— | C₂H₅— |
| 9-N(CH₃)₂ | O | H— | 2-H₂NO₂SC₆H₄— |
| 9-N(CH₃)₂ | O | H— | 2-HO₂CC₆H₄— |
| 9-N(CH₃)₂ | O | —(CH₂)₅— | |
| 6-N(CH₃)₂ | S | CH₃— | CH₃— |
| 6-N(CH₃)₂ | S | n-C₃H₇— | n-C₃H₇— |
| 6-N(CH₃)₂ | S | —(CH₂)₂O(CH₂)₂— | |
| 7-N(CH₃)₂ | S | —(CH₂)₂N(CH₃)(CH₂)₂— | |
| 8-N(CH₃)₂ | S | H— | H— |
| 8-N(CH₃)₂ | S | CH₃— | H— |
| 8-N(CH₃)₂ | S | Cyclo C₆H₁₁— | H— |
| 8-N(CH₃)₂ | S | Cyclo C₆H₁₁— | CH₃— |
| 9-N(CH₃)₂ | S | H— | H— |
| 9-N(CH₃)₂ | S | CH₃— | CH₃— |
| 9-N(CH₃)₂ | S | C₂H₅— | C₂H₅— |
| 9-N(CH₃)₂ | S | H— | 2-H₂NO₂SC₆H₄— |
| 9-N(CH₃)₂ | S | H— | 2-HO₂CC₆H₄— |

EXAMPLE XXIII

Tablets

A tablet base is prepared by blending the following ingredients in the proportion by weight indicated:

Sucrose, U.S.P. _____ 80.3
Tapioca starch _____ 13.2
Magnesium stearate _____ 6.5

Into this tablet base there is blended sufficient 4-diethyl- aminobenzothieno-[3,2-d]pyrimidine hydrochloride to provide tablets containing 20, 100 and 250 mg. of active ingredient per tablet. The compositions are each compressed into tablets, each weighing 360 mg., by conventional means.

EXAMPLE XXIV

Capsules

A blend is prepared containing the following ingredients:

Calcium carbonate, U.S.P. _____ 17.6
Dicalcium phosphate _____ 18.8
Magnesium trisilicate, U.S.P. _____ 5.2
Lactose, U.S.P. _____ 5.2
Potato starch _____ 5.2
Magnesium stearate A _____ 0.8
Magnesium stearate B _____ 0.35

To this blend is added sufficient 4-(di-n-propyl)amino-benzothieno[3,2-d]-pyrimidine hydrochloride to provide capsules containing 20, 100 and 250 mg. of active ingredient per capsule. The compositions are filled into conventional hard gelatin capsules in the amount of 350 mg. per capsule.

EXAMPLE XXV

Injectable preparation

One thousand grams of 4-diethylaminobenzofuro[3,2-d]pyrimidine hydrochloride are intimately mixed and ground with 2500 grams of sodium ascorbate. The ground dry mixture is placed in vials and sterilized with ethylene oxide after which the vials are sterilely stoppered. For intravenous administration, sufficient water is added to the materials in the vials to form a soltuion containing 10 mg. of active ingredient per milliliter of injectable solution.

EXAMPLE XXVI

Suspension

A suspension of 4-(2-sulfamoylphenyl)aminobenzofuro [3,2-d]pyrimidine is prepared with the following composition:

Effective ingredient _____g__ 25.00
70% aqueous sorbitol _____g__ 741.29
Glycerine, U.S.P. _____g__ 185.35
Gum acacia (10% solution) _____ml__ 100.00
Polyvinylpyrrolidone _____g__ 0.50
Distilled water sufficient to make 1 liter.

To this suspension, various sweeteners and flavorants are added to improve the palatability of the suspension. The suspension contains approximately 25 mg. of effective agent per milliliter.

EXAMPLE XXVII

Solution

A solution of 4-(2-carboxyphenyl)aminobenzofuro[3,2-d]pyrimidine hydrochloride is prepared with the following composition:

Effective ingredient _____grams__ 30.22
Magnesium chloride hexahydrate _____do__ 12.36
Monoethanolamine _____ml__ 8.85
Propylene glycol _____grams__ 376.00
Water, distilled _____ml__ 94.00

The resultant solution has a concentration of effective ingredient of 50 mg./ml. and is suitable for parenteral and especially for intramuscular administration.

EXAMPLE XXVIII 4-diethylaminobenzothieno[3,2-d]pyrimidine oxalate

To a solution of 2.93 g. (0.01 mole) of 4-diethylaminobenzothieno[3,2-d]pyrimidine hydrochloride prepared in Example I in 30 ml. of water is added sufficient 10% sodium hydroxide solution to a give a pH of 9–10. The precipitated free base is extracted with ether and the ether layer separated and dried over anhydrous sodium sulfate. The dried ether layer is added rapidly with stirring to an ethanol (50 ml.) solution containing 900 mg. (0.01 mole) of oxalic acid. The mixture is allowed to stir for 20 minutes in an ice bath and is then filtered to provide the desired oxalate salt.

EXAMPLE XXIX

Employing the aforedescribed technic for determining inhibition of collagen induced platelet aggregation, the following 4-aminobenzothieno[3,2-d]pyrimidines were tested at concentrations of $10^{-4}$ and $10^{-6}$ moles/liter and provided the following results:

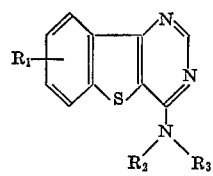

| $R_1$ | $R_2$ | $R_3$ | Percent inhibition at $10^{-4}$ mol./l. | Percent inhibition at $10^{-6}$ mol./l. |
|---|---|---|---|---|
| H | $CH_3-$ | $CH_3-$ | | 80 |
| H | $C_2H_5-$ | $C_2H_5-$ | 90 | |
| H | $n-C_3H_7-$ | $n-C_3H_7-$ | | 92 |
| H | $n-C_4H_9-$ | $n-C_4H_9-$ | | 77 |
| H | $HO(CH_2)_2-$ | $HO(CH_2)_2-$ | 99 | |
| H | H— | $N(CH_3)_2(CH_2)_2-$ | 99 | |
| H | —$(CH_2)_2O(CH_2)_2-$ | | 76 | |
| H | —$(CH_2)_4-$ | | | 29 |
| H | —$(CH_2)_5-$ | | 96 | |
| H | —$(CH_2)_7-$ | | | 90 |
| H | —$(CH_2)_2N(CH_3)(CH_2)_2-$ | | | 55 |
| $9-CF_3$ | H— | H— | | 16 |
| $9-CF_3$ | H— | $C_2H_5-$ | | 5 |
| $9-CF_3$ | $C_2H_5-$ | $C_2H_5-$ | 95 | |
| $9-CF_3$ | $n-C_3H_7-$ | $n-C_3H_7-$ | | 87 |
| $9-CF_3$ | H— | $N(CH_3)_2(CH_2)_2-$ | 43 | |
| $9-CF_3$ | —$(CH_2)_4-$ | | | 21 |
| $9-CF_3$ | —$(CH_2)_2O(CH_2)_2-$ | | | 21 |
| $9-CF_3$ | —$(CH_2)_2N(CH_3)(CH_2)_2-$ | | 99 | |

EXAMPLE XXX

Repeating the aforementioned method for determining inhibition of collagen induced platelet aggregation, as in Example XXIX, the following 4-aminobenzofuro[3,2-d]pyrimidines were tested at concentrations of $10^{-4}$ and $10^{-6}$ moles/liter and gave the following results:

| $R_2$ | $R_3$ | $R_5$ | Percent inhibition at $10^{-4}$ mol./l. | Percent inhibition at $10^{-6}$ mol./l. |
|---|---|---|---|---|
| H— | H— | H— | 96 | |
| H— | $CH_3-$ | H— | | 10 |
| H— | $C_2H_5-$ | H— | | 5 |
| $CH_3-$ | $CH_3-$ | H— | | 65 |
| $C_2H_5-$ | $C_2H_5-$ | H— | 99 | 82 |
| $C_2H_5-$ | $C_2H_5-$ | $CH_3-$ | 78 | 56 |
| $n-C_3H_7-$ | $n-C_3H_7-$ | H— | 81 | |
| $n-C_3H_7-$ | $n-C_3H_7-$ | $CH_3-$ | 96 | 56 |
| H— | $HO(CH_2)_2-$ | H— | 99 | |
| $CH_3-$ | $HO_2CCH_2-$ | H— | 99 | |
| —$(CH_2)_5-$ | | H— | 99 | |
| —$(CH_2)_4-$ | | H— | 99 | |
| —$(CH_2)_7-$ | | H— | | 15 |
| H— | Cyclo $C_6H_{11}-$ | H— | 81 | |
| H— | $2-HO_2CC_6H_4-$ | H— | 26 | |
| H— | $2-H_2NSO_2C_6H_4-$ | H— | | 70 |
| H— | 2-pyridyl— | H— | | 91 |
| H— | 4-methyl-2-pyridyl— | H— | 28 | |
| H— | 2,6-dimethyl-4-pyrimidyl— | H— | 67 | |
| H— | 4,6-dimethyl-2-pyrimidyl— | H— | 43 | |
| H— | 4,6-dimethyl-2-pyrimidyl— | H— | 99 | |

EXAMPLE XXXI

In vivo inhibition of platelet aggregation

The capacity of the compounds of the present invention to inhibit platelet aggregation in a modified in vivo test is measured by the following procedure:

Unanesthetized fasted adult mongrel dogs of either sex are dosed orally (P.O.) or intravenously (I.V) with the particular test compound. Blood samples are taken at hourly intervals and placed in plastic centrifuge tubes containing 0.1 volume 3% sodium citrate. Platelet-rich plasma is separated by centrifugation at 100G for 10 minutes at 20° C. and treated with a collagen suspension in saline. The effect of two different levels of collagen concentration are examined; the first is a 1:20 dilution, i.e. 1 ml. of collagen suspension per 20 ml. of platelet-rich plasma (high dose), and the second, a 1:40–50 dilution (low dose). Changes in optical density are then followed with a Spectronic 20 colorimeter attached to a Houston Instrument TY Recorder. Platelet aggregation is indicated by a decrease in optical density. The degree of inhibition of collagen induced aggregation is reported as complete (95–100%) partial (15–95%) and none (0–15%). Measurements are carried out on the hourly samples, allowing for the determination of a duration of the initial effect.

Employing the above described procedure the following compounds are tested:

| Dose, mg./kg. | Route | Inhibition to collagen dose High | Inhibition to collagen dose Low | Duration, hours |
|---|---|---|---|---|
| $R_1=H; X=O; R_2, R_3=C_2H_5; R_5=H$: | | | | |
| 30 | P.O. | None | Complete | 5 |
| 10 | I.V. | do | do | 5 |
| $R_1=8-CF_3; X=S; R_2, R_3=n-C_3H_7; R_5=H$: | | | | |
| 30 | P.O. | do | Partial | 4 |
| 10 | I.V. | do | do | 1 |

TABLE—Continued

| Dose, mg./kg. | Route | Inhibition to collagen dose | | Duration hour |
|---|---|---|---|---|
| | | High | Low | |
| $R_1=H; X=O; R_2=H; R_3=2\text{-}OH_2CC_6H_4;$ $R_5=H:$ | | | | |
| 30 | P.O. | Partial | do | 5 |
| 10 | I.V. | None | do | 5 |
| $R_1=H; X=O; R_2=H; R_3=2\text{-}H_2NSO_2C_6H_4;$ $R_5=H:$ | | | | |
| 30 | P.O. | Partial | do | 5 |
| $R_1=H; X=S; R_2, R_3=HO(CH_2)_2\text{-}; R_5=H:$ | | | | |
| 10 | I.V. | do | Complete | 5 |
| $R_1=H; X=O; R_2, R_3=\text{n-}C_3H_7; R_5=CH_3:$ | | | | |
| 10 | I.V. | do | Partial | 2 |
| $R_1=H; X=O; R_2, R_3=C_2H_5; R_5=CH_3:$ | | | | |
| 20 | P.O. | None | Complete | 6 |
| 5 | I.V. | Partial | do | 4 |
| 2 | I.V. | do | do | 1 |

PREPARATION A o-Chlorobenzonitriles (a) o-Chlorobenzonitrile.—A mixture containing 519 g. (3.0 moles) of ammonium o-chlorobenzoate and 230 g. (0.66 mole) of phosphonitrile chloride is heated to 120° C., at which temperature the evolution of hydrogen chloride gas commences. Heating is continued until the temperature of the mixture reaches 200–240° C. and is maintained for 5–6 hours. The mixture is distilled under reduced pressure and the product, which solidifies in cooling, is collected, M.P. 45–46° C.

The following o-chlorobenzonitriles not previously reported in the chemical literature are synthesized by the aforementioned procedure which is essentially that as taught by Nakaoka et al., German Pat. No. 1,230,026 (C.A. 66, 55255e):

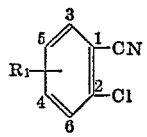

| $R_1$ | $R_1$ |
|---|---|
| 3-F | 4,5-$(OCH_3)_2$ |
| 3-Br | 5-$OCH_3$ |
| 4-F | 3-$N(CH_3)_2$ |
| 5-F | 4-$N(CH_3)_2$ |
| 5-Br | 5-$N(CH_3)_2$ |
| 3-$OCH_3$ | 6-$N(CH_3)_2$ |
| 4-$OCH_3$ | |

PREPARATION B o-Hydroxybenzonitriles

Employing the procedure of Preparation A the following o-hydroxybenzonitriles not previously reported in the literature are synthesized:

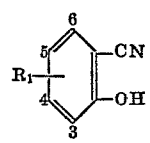

| $R_1$ | $R_1$ |
|---|---|
| 3-F | 4,5-$(OCH_3)_2$ |
| 4-F | 3-$NO_2$ |
| 4-Cl | 3-$N(CH_3)_2$ |
| 4-Br | 4-$N(CH_3)_2$ |
| 5-F | 5-$N(CH_3)_2$ |
| 6-F | 6-$N(CH_3)_2$ |
| 6-Br | |

PREPARATION C

Following the procedure of Example I(A) and starting with the requisite o-chlorobenzonitrile the 2-carbomethoxy-3-aminobenzothiophenes not reported previously in the literature are prepared:

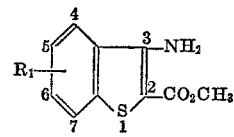

| $R_1$ | $R_1$ |
|---|---|
| 4-F | 5-$N(CH_3)_2$ |
| 4-Cl | 6-F |
| 4-Br | 6-Cl |
| 4-OH | 6-OH |
| 4-$OCH_3$ | 6-$OCH_3$ |
| 4-$NO_2$ | 6-$NO_2$ |
| 4-$N(CH_3)_2$ | 6-$N(CH_3)_2$ |
| 5-$CF_3$ | 7-F |
| 5-F | 7-Cl |
| 5-Cl | 7-Br |
| 5-Br | 7-OH |
| 5-OH | 7-$OCH_3$ |
| 5-$OCH_3$ | 7-$N(CH_3)_2$ |
| 5-$NO_2$ | 5,6-$(OCH_3)_2$ |

PREPARATION D

The procedure of Example II(A) is repeated using the appropriately substituted o-hydroxybenzonitriles to provide the following ethyl 2-cyanophenoxyacetates not previously reported in the chemical literature:

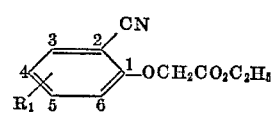

| $R_1$ | $R_1$ |
|---|---|
| 3-F | 5-Br |
| 3-Cl | 5-OH |
| 3-Br | 5-$OCH_3$ |
| 3-OH | 5-$NO_2$ |
| 3-$OCH_3$ | 5-$N(CH_3)_2$ |
| 3-$NO_2$ | 6-F |
| 3-$N(CH_3)_2$ | 6-Cl |
| 4-F | 6-Br |
| 4-Cl | 6-OH |
| 4-$OCH_3$ | 6-$OCH_3$ |
| 4-$NO_2$ | 6-$NO_2$ |
| 4-$N(CH_3)_2$ | 6-$N(CH_3)_2$ |
| 5-F | 4,5-$(OCH_3)_2$ |
| 5-Cl | |

PREPARATION E

The procedure of Example II(B) is repeated, starting with the requisite starting materials, to provide the following 2-carbethoxy-3-aminobenzofuran congeners not reported in the literature:

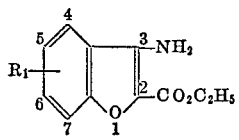

| $R_1$ | $R_1$ |
|---|---|
| 4-F | 6-F |
| 4-Cl | 6-Cl |
| 4-Br | 6-Br |
| 4-OH | 6-OH |
| 4-OCH$_3$ | 6-OCH$_3$ |
| 4-NO$_2$ | 6-NO$_2$ |
| 4-N(CH$_3$)$_2$ | 6-N(CH$_3$)$_2$ |
| 5-F | 7-F |
| 5-Cl | 7-Cl |
| 5-OCH$_3$ | 7-Br |
| 5-NO$_2$ | 7-OH |
| 5-N(CH$_3$)$_2$ | 7-OCH$_3$ |
|  | 7-NO$_2$ |
|  | 7-N(CH$_3$)$_2$ |

PREPARATION F

The procedure of Example III(A) is repeated, employing the appropriate starting reagents, to provide the following new 2-carbethoxy-3-acylaminobenzofurans:

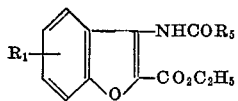

$R_1$=H; $R_5$=C$_2$H$_5$, n-C$_4$H$_9$

PREPARATION G 4-hydroxybenzothieno[3,2-d]pyrimidines

The experimental procedure of Example I(B) is followed, starting with the requisite 2-carbomethoxy-3-aminobenzothiophenes, to provide intermediates of the formula:

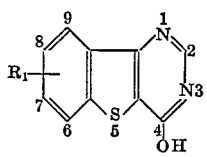

| $R_1$ |  |
|---|---|
| 6-F | 7-NO$_2$ |
| 6-Cl | 7-N(CH$_3$)$_2$ |
| 6-Br | 7,8-(OCH$_3$)$_2$ |
| 6-OH | 8-CF$_3$ |
| 6-OCH$_3$ | 8-OH |
| 6-N(CH$_3$)$_2$ | 8-OCH$_3$ |
| 7-F | 8-NO$_2$ |
| 7-Cl | 8-N(CH$_3$)$_2$ |
| 7-OH | 9-F |
| 7-OCH$_3$ | 9-Cl |
| $R_1$ | 9-Br |
| 8-F | 9-OH |
| 8-Cl | 9-OCH$_3$ |
| 8-Br | 9-NO$_2$ |
|  | 9-N(CH$_3$)$_2$ |

PREPARATION H 4-hydroxybenzofuro[3,2-d]pyrimidines

Starting with the requisite reagents and following the procedures of Example II(C) the following intermediates of the formula

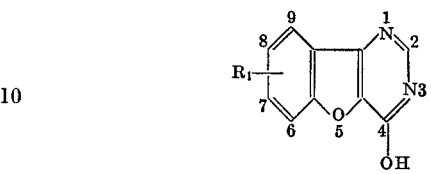

are thus prepared:

| $R_1$ | $R_1$ |
|---|---|
| 6-F | 8-F |
| 6-Cl | 8-Cl |
| 6-Br | 8-OCH$_3$ |
| 6-OH | 8-NO$_2$ |
| 6-OCH$_3$ | 8-N(CH$_3$)$_2$ |
| 6-NO$_2$ | 9-F |
| 6-N(CH$_3$)$_2$ | 9-Cl |
| 7-F | 9-Br |
| 7-Cl | 9-OH |
| 7-Br | 9-OCH$_3$ |
| 7-OH | 9-NO$_2$ |
| 7-OCH$_3$ | 9-N(CH$_3$)$_2$ |
| 7-NO$_2$ | 7,8-(OCH$_3$)$_2$ |
| 7-N(CH$_3$)$_2$ |  |

PREPARATION I

Starting with the intermediate 2-carbethoxy-3-acylaminobenzofurans of Preparation F and following the procedure of Example III(B) the following 4-hydroxybenzofuro[3,2-d]pyrimidines of the formula

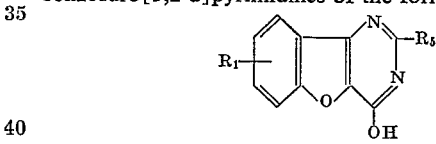

are thus prepared: $R_1$=H; $R_5$=C$_2$H$_5$, n-C$_4$H$_9$

PREPARATION J 4-chlorobenzothieno[3,2-d]pyrimidines

The following intermediates not previously reported in the chemical literature are synthesized according to the procedure of Example I(C):

| Position of $R_1$ substituent | | | |
|---|---|---|---|
| 6 | 7 | 8 | 9 |
| F | F | F | F |
| Cl | Cl | Cl | Cl |
| Br | CH | Br | Br |
| OH | OCH$_3$ | OH | OH |
| OCH$_3$ | NO$_2$ | OCH$_3$ | OCH$_3$ |
| N(CH$_3$)$_2$ | N(CH$_3$)$_2$ | NO$_2$ | NO$_2$ |
|  |  | N(CH$_3$)$_2$ | N(CH$_3$)$_2$ | and 7,8-(OCH$_3$)$_2$

PREPARATION K 4-chlorobenzofuro[3,2-d]pyrimidines

Employing the procedure of Example II(D) and starting with the reagents of Preparations H and I the following new compounds are prepared:

| $R_1$ | $R_5$ | $R_1$ | $R_5$ |
|---|---|---|---|
| H | C$_2$H$_5$ | 8-F | H |
| H | n-C$_4$H$_9$ | 8-Cl | H |
| 6-F | H | 8-OCH$_3$ | H |
| 6-Cl | H | 8-NO$_2$ | H |
| 6-Br | H | 8-N(CH$_3$)$_2$ | H |
| 6-OH | H | 9-F | H |
| 6-OCH$_3$ | H | 9-Cl | H |
| 6-NO$_2$ | H | 9-Br | H |
| 6-N(CH$_3$)$_2$ | H | 9-OH | H |
| 7-F | H | 9-OCH$_3$ | H |
| 7-Cl | H | 9-NO$_2$ | H |
| 7-Br | H | 9-N(CH$_3$)$_2$ | H |
| 7-OH | H | 7,8-(OCH$_3$)$_2$ | H |
| 7-OCH$_3$ | H |  |  |
| 7-NO$_2$ | H |  |  |
| 7-N(CH$_3$)$_2$ | H |  |  |

What is claimed is:
1. The method of inhibiting platelet aggregation in blood of warm-blooded animals which comprises administering to said animal an effective amount of a compound selected from those of the formula:

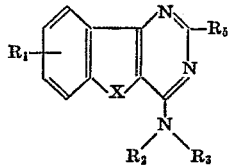

and the pharmaceutically acceptable acid addition salts thereof, wherein:

$R_1$ is hydrogen; fluorine; chlorine; bromine; trifluoromethyl; hydroxy; methoxy; 7,8-dimethoxy; nitro; dimethylamino; amino and substituted amino wherein said substituent is selected from the group consisting of alkylsulfonyl and alkanoyl containing 1 to 3 carbon atoms, benzoyl and carbalkoxy of the formula —$CO_2R_4$ wherein $R_4$ is alkyl containing 2 to 5 carbon atoms; carboxamido of the formula —$CONHR_4$ and carbalkoxy of the formula —$CO_2R_4$ wherein $R_4$ is hydrogen or alkyl containing 1 to 4 carbon atoms;

$R_2$ and $R_3$ when considered separately are each selected from the group consisting of hydrogen; alkyl and monosubstituted alkyl wherein both alkyl moieties contain from 1 to 6 carbon atoms and said substituent is selected from the group consisting of hydroxy, carboxy, and dialkylamino said alkyl containing 1 to 3 carbon atoms; phenyl; monosubstituted phenyl wherein said substituent is selected from the group consisting of carboxy, sulfamoyl and carboxamido; pyridyl; monosubstituted pyridyl wherein said substituent is selected from the group consisting of carboxy, carboxamido and alkyl containing 1 to 3 carbon atoms; cycloalkyl containing 3 to 7 carbon atoms; pyrimidyl; substituted pyrimidyl wherein said substituent is 1 or 2 methyl substituents;

$R_2$ and $R_3$ when taken together with the nitrogen atom to which they are attached form a ring of the formula:

wherein Z is selected from the group consisting of $CH_2$, O, S and N-alkyl said alkyl containing 1 to 6 carbon atoms; $m$ and $n$ are each integers of 2 or 3; X is O or S.

2. The method of claim 1 wherein $R_1$ is hydrogen and $R_2$ and $R_3$ are alkyl containing 1 to 6 carbon atoms.
3. The method of claim 2 wherein said compound is 4-diethylaminobenzothieno[3,2-d]pyrimidine.
4. The method of claim 2 wherein said compound is 4-(di-n-propyl)aminobenzothieno[3,2-d]pyrimidine.
5. The method of claim 2 wherein said compound is 4-diethylaminobenzofuro[3,2-d]pyrimidine.
6. The method of claim 1 wherein $R_1$ and $R_2$ are hydrogen and $R_3$ is monosubstituted phenyl.
7. The method of claim 6 wherein said compound is 4-(2-carboxyphenyl)aminobenzofuro[3,2-d]pyrimidine.
8. The method of claim 6 wherein said compound is 4-(2-sulfamoylphenyl)aminobenzofuro[3,2-d]pyrimidine.

References Cited

Chem. Abst. Subject Index, vol. 71 (1969), p. 584s.

SAM ROSEN, Primary Examiner

U.S. Cl. X.R.
424—246, 248

UNITED STATES PATENT OFFICE
CERTIFICATE OF CORRECTION

Patent No. 3,755,583               Dated August 28, 1973

Inventor(s) DE ANGELIS ET AL

It is certified that error appears in the above-identified patent and that said Letters Patent are hereby corrected as shown below:

| | CHANGE | TO |
|---|---|---|
| Col. 1, lines 41-42 | "antipholgistic" | --antiphlogistic-- |
| Col. 1, line 72 | "nitro-dimeth-" | --nitro; dimeth- -- |
| Col. 2, lines 60-65 Col. 3, lines 1-10 | 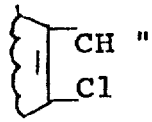 III | 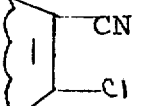 III |
| Col. 4, lines 55-61 |  | 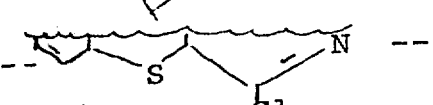 |
| Col. 6, line 9 | "a" | --at-- |
| Col. 6, line 72 | "benzotrieno" | --benzothieno-- |
| Col. 8, line 13 | "a" (first occurrence) | --as-- |
| Col. 11, line 6 | "49" | --249-- |

UNITED STATES PATENT OFFICE
CERTIFICATE OF CORRECTION

Patent No. 3,755,583     Dated August 28, 1973

Inventor(s) DE ANGELIS ET AL     Page 2

It is certified that error appears in the above-identified patent and that said Letters Patent are hereby corrected as shown below:

| | CHANGE | TO |
|---|---|---|
| Col. 13, line 62 | "added g. 0.038 mole)" | --added 6.3 g. (0.038 mole)-- |
| Col. 14, line 4 | "phenpyl" | --phenyl-- |
| Col. 14, line 34 | "227" | --277-- |
| Col. 15, line 15 | "724" | --274-- |
| Col. 15, line 72 | "4-Dimethylamino" | --4-(1-Pyrrolidyl)-- |
| Col. 16, lines 18-28 | 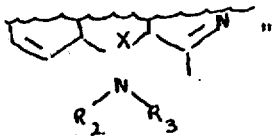 | 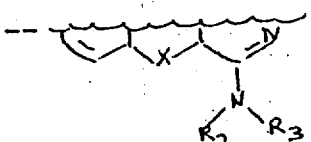 |
| Col. 17, 8th line from end of table | "9-OH   S   H   H" | --9-OH   S   H   $CH_3$-- |
| Col. 18, lines 48-55 | 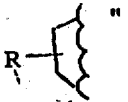 | 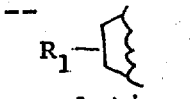 |
| Col. 20, line 37 | "soltuion" | --solution-- |
| Col. 22, lines 3-10 |  | 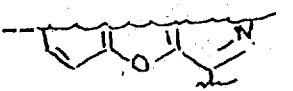 |

UNITED STATES PATENT OFFICE
CERTIFICATE OF CORRECTION

Patent No. 3,755,583      Dated August 28, 1973

Inventor(s) DE ANGELIS ET AL      Page 3

It is certified that error appears in the above-identified patent and that said Letters Patent are hereby corrected as shown below:

| | CHANGE | TO |
|---|---|---|
| Col. 22, 6th line from end | "$C_2H_3$" | -- $C_2H_5$ -- |
| Col. 23, line 5 | "$OH_2CC_6H_4$" | -- $HO_2CC_6H_4$ -- |
| Col. 23, lines 34-40 | 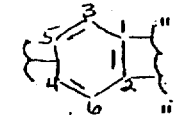 |  |
| Col. 23, lines 56-62 |  | 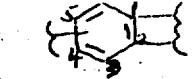 |
| Col. 25, line 60 | add--$R_1$--above "$7NO_2$" | |
| Col. 25, line 72 | delete "$R_1$" | |
| Col. 26, line 47 | After "Example 1(C):add-- | 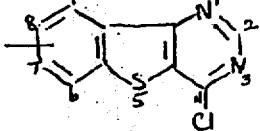 -- |
| Col. 26, line 62 | After "prepared" | add--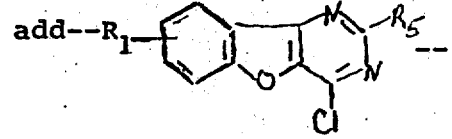 -- |

Signed and sealed this 17th day of September 1974.

(SEAL)
Attest:

McCOY M. GIBSON, JR.
Attesting Officer

C. MARSHALL DANN
Commissioner of Patents